United States Patent [19]

Fukushima

[11] Patent Number: 4,816,937
[45] Date of Patent: Mar. 28, 1989

[54] RECORDING AND/OR REPRODUCTION APPARATUS CAPABLE OF RETAINING START UP INFORMATION

[75] Inventor: Nobuo Fukushima, Yokohama, Japan

[73] Assignee: Canon Kabushiki Kaisha, Tokyo, Japan

[21] Appl. No.: 914,321

[22] Filed: Oct. 2, 1986

[30] Foreign Application Priority Data

Oct. 17, 1985 [JP] Japan ............... 60-231784
Oct. 21, 1985 [JP] Japan ............... 60-234904

[51] Int. Cl.$^4$ ............................ G11B 19/247
[52] U.S. Cl. ..................... 360/73.03; 318/314
[58] Field of Search ........... 360/71, 73; 369/47, 369/50, 32; 318/314, 341, 599

[56] References Cited

U.S. PATENT DOCUMENTS

| | | | |
|---|---|---|---|
| 3,503,058 | 3/1970 | Ault et al. | 360/73 |
| 3,934,269 | 1/1976 | Fujita et al. | 318/327 X |
| 4,003,090 | 1/1977 | Beck | 360/70 |
| 4,123,779 | 10/1978 | Goldschmidt | 318/314 |
| 4,127,881 | 11/1978 | Wakami et al. | 360/73 |
| 4,242,619 | 12/1980 | Nakamura et al. | 318/314 |
| 4,271,382 | 6/1981 | Maeda et al. | 318/314 |
| 4,283,671 | 8/1981 | Nakano et al. | 318/314 |
| 4,301,395 | 11/1981 | Furuhata et al. | 318/314 |
| 4,307,417 | 12/1981 | Tokuyama | 358/127 |
| 4,316,143 | 2/1982 | Castle | 324/161 |
| 4,323,832 | 4/1982 | Okamura | 318/314 |
| 4,338,683 | 7/1982 | Furukawa et al. | 369/50 |
| 4,355,266 | 10/1982 | Pearson | 318/85 |
| 4,386,300 | 5/1983 | Ogawa | 318/314 |
| 4,432,021 | 2/1984 | Kaneko | 358/342 |
| 4,441,061 | 4/1984 | Yoshida et al. | 318/329 |
| 4,484,235 | 11/1984 | Yokobori et al. | 360/70 |
| 4,498,034 | 2/1985 | Shirakawa | 318/314 |
| 4,500,822 | 2/1985 | Tajima et al. | 318/314 |
| 4,506,202 | 3/1985 | Tajima et al. | 318/599 |
| 4,539,606 | 9/1985 | Itoh | 360/70 |
| 4,542,423 | 9/1985 | Kotake et al. | 360/73 |
| 4,543,516 | 9/1985 | Kobori et al. | 318/314 |
| 4,562,394 | 12/1985 | Itoh | 318/608 |
| 4,568,986 | 2/1986 | Furuhata et al. | 360/10.2 |
| 4,575,835 | 3/1986 | Nishikawa et al. | 369/50 |
| 4,599,545 | 7/1986 | Moriki et al. | 318/314 |
| 4,603,412 | 7/1986 | Yamazaki | 369/50 |
| 4,605,976 | 8/1986 | Ito et al. | 360/70 |
| 4,613,799 | 9/1986 | Sumi | 318/314 |
| 4,623,939 | 11/1986 | Machida et al. | 358/342 |
| 4,658,191 | 4/1987 | Okita et al. | 318/341 |
| 4,675,855 | 6/1987 | Iso et al. | 360/73 |

Primary Examiner—Raymond F. Cardillo
Assistant Examiner—David L. Robertson
Attorney, Agent, or Firm—Fitzpatrick, Cella, Harper & Scinto

[57] ABSTRACT

A recording and/or reproducing apparatus in which a head is driven along a disk while the disc is rotated. A rotation speed control and a rotation phase control are provided to control the disc rotation. The apparatus is operated in a phase control mode until the phase of the disc rotation deviates from a reference phase by a predetermined amount. Then the apparatus switches to speed control. A memory is used to store data concerning start up information to reduce the required amount of start up time required in future operations.

27 Claims, 9 Drawing Sheets

RECORDING AND/OR REPRODUCTION APPARATUS CAPABLE OF RETAINING START UP INFORMATION

BACKGROUND OF THE INVENTION

1. Field of the Invention

The present invention relates to recording and/or reproducing apparatus. More particularly, the present invention concerns means for controlling and relative movement between a recording and/or reproducing head means and a record bearing bearing medium in a recording and/or reproducing apparatus.

2. Description of the Related Art

In a recording and/or reproducing apparatus such as, for example, a still video apparatus using a magnetic disc as a record bearing medium, a motor which rotates the disc relative to a magnetic head is controlled so that the disc rotation is synchronized with a reference signal. Specifically, the disc rotation is controlled by a deviation signal which corresponds to the phase difference between a rotation phase signal and a reference signal. The rotation signal usually has a cycle equal to that of the disc or the rotor rotation (i.e. once per one revolution); and the reference signal usually comprises a TV vertical synchronization signal.

However, in prior control arrangements a delay was experienced between the starting of the drive motor and the achievement of synchronization. Also, since the deviation signal could be obtained only once per one revolution of disc or the rotor, a poor response and low precision of synchronization was experienced.

In Japanese Patent Application Nos. Sho. 60-53144, 53144/1985. (U.S. Counterpart: Patent Application Ser. No. 839,058; Filed: Mar. 13, 1986; Title: "Rotary body drive device"; Inventor: Nobuo Fukushima; Assigner; to same assignee as the present invention), there is disclosed a recording and/or reproducing apparatus which comprises a magnetic head, a motor, a motor control circuit and a synchronization signal generation circuit. The magnetic head magnetically records signals on and/or reproduces signals from a magnetic disc while the motor rotates the disc relative to the head. The motor control circuit includes reference signal generation means and phase control means. The reference signal generation means generates a reference signal for phase control when the rotation of the disc reaches a predetermined speed. The phase control means controls the rotation phase of the disc on the basis of the reference signal and a disc rotation speed signal known as an FG signal. Also the synchronization signal generation means generates, in response to a specific rotation phase of the disc, a synchronization signal to be used in a signal processing circuit.

The reference signal generation means may be arranged to generate the reference signal on the basis of the FG signal.

On the other hand, in a conventional motor control arrangement, a considerable time is needed from the start of the motor to share synchronization. This is due to fluctuations of the load on the motor caused by changes in environmental conditions such as temperature and humidity, etc. Even if the time to the phase synchronization is adjusted satisfactorily, when the power supply to the system is turned on after it has been turned off, considerable time is required to achieve phase synchronization again.

The control amount needed to control a motor so as to rotate the head and the medium relative to one another is generally given by the following formula (1):

$$\text{Control amount} = (G1) \times (PDA) + (G2) \times (SDA) + (G3) \times (IPDA) + (\text{Offset value C}) \quad (1)$$

Here, PDA is the phase deviation amount, SDA is the speed deviation amount and IPDA is the integrated value of the phase deviation amount. Also, G1, G2 and G3 are constants. The offset value C represents the control amount required to control the motor at a predetermined speed, for example, 3,600 r.p.m. when the phase deviation amount, the speed, deviation amount and the integrated value of the phase deviation amount are all zero. The control amount shown by formula (1) may be supplied from a system controller in the recording and/or reproducing apparatus to control the speed and the phase of the motor.

The integrated value of the phase deviation amount in the third term of the formula (1) represents the low frequency component in the fluctuation of the load to the motor. In the formula (1), when the load increases due to the change in the temperature or the humidity, etc., of the surroundings, the above mentioned integrated value increases, and conversely, when the load decreases, the integrated value decreases. On the other hand, the time constant necesary for the integration of the phase deviation amount is determined by the constant G3 and cannot be set at a very small value because of the stability of the control. Accordingly, a relatively long time is required from the start of the motor until the integration value is determined. During this time the speed and the phase of the motor are offset from their respective target values. Thus, as a result, the required time to phase synchronization becomes long. Also, even if the control amount is set at a desired amount, when the power supply to the system is turned on after it has been turned off, considerable time is needed to achieve the phase synchronization again.

SUMMARY OF THE INVENTION

The present invention is generally in the nature of improvements over the invention described in Japanese Patent Application No. Sho. 60-53144 (U.S. Counterpart Ser. No. 839,058, filed Mar. 13, 1986).

According to a first aspect of the present invention, there is provided a recording and/or reproducing apparatus which comprises head means, drive means, rotation control means and mode control means. The head means is provided for recording signals on and/or reproducing signals from a record bearing medium. The drive means rotates the head means and the medium relative to each other. The rotation control means controls the speed and phase of the relative rotation between the head means and the medium and has a first operation mode for controlling the speed and a second operation mode for controlling the phase. Also the mode control means controls the operation mode of the rotation control means. The mode control means resets the operation mode of the rotation control means at the first mode when, during operation in the second mode, the phase of the relative rotation deviates from a reference phase beyond a predetermined limit.

According to second aspect of the present invention, there is provided a recording and/or reproducing aparatus which comprises head means, moving means, drive means, rotation control means and mode control means. The head means is provided for recording signals on and/or reproducing signals from a record bearing medium. The moving means moves the head means relative to the medium. The drive means rotates the medium relative to the head means. The rotation control means controls the rotation speed and rotation phase of the medium and has a first operation mode for controlling the speed and a second operation mode for controlling the phase. The mode control means controls the operation mode of the rotation control means; and the mode control means also sets the operation mode of the rotation control means at the first mode in response to the movement of the head means.

In the preferred embodiments of the present invention, the mode control means is arranged to shift the operation mode of the rotation control means from the first to the second mode when the rotation speed reaches a predetermined speed. The mode control means may be further arranged to set the operation mode of the rotation control means at the first mode in response to operation of a switch means which is provided for causing the drive means to operate.

Moreover, the drive means may include for generating a signal indicative of the rotation speed; and the rotation control means may include first means for generating a reference signal for phase controlling and second means for controlling rotation speed and rotation phase. The second means controls the speed, in the first mode, on the basis of the rotation speed signal; and it controls the phase, in the second mode, on the basis of the rotation speed signal and the reference signal. The mode control means may be arranged to control the operation mode of the second means. The mode control means may be further arranged to operate the first means to generate the reference signal when the rotation speed reaches the predetermined speed. The mode control means may also be arranged to operate the reference signal generation means to generate the reference signal on the basis of the rotation speed signal.

In this aspect, the apparatus of this invention may further comprise signal processing means and synchronization signal generation means. The signal processing means processes an input signal into a recording signal and/or a reproducing signal on the basis of a synchronization signal. Also, the synchronization signal generation means generates the synchronization signal on the basis of the relative rotation between the head means and the medium. The synchronization signal generation means may be arranged to generate the synchronization signal in synchronism with a specific phase of the relative rotation. The synchronization signal generation means may include detection means and circuit means. The detection means detects the specific phase of the relative rotation and generates a detection signal in response thereto. Also, the circuit means generates the synchronization signal in response to the detection signal. Here, the mode control means can be further arranged to operate the synchronization signal generation means to generate the synchronization signal. The mode control means may be arranged to control the synchronization signal generation means in response to the phase control state by the rotation control means. The mode control may be arranged to cause the synchronization signal generation means to generate the synchronization signal when the rotation speed signal is substantially synchronized with the reference signal.

Furthermore, the apparatus may be arranged to be used with a magnetic disc as the record bearing medium, in which the drive means includes a motor to rotate the disc relative to a magnetic head as the head means and the rotation control means controls the rotation speed and the rotation phase of the disc or the motor rotor.

According to third aspect of the present invention, there is also provided a recording and/or reproducing apparatus which comprises a head means, drive means, memory means and drive control means. The head means is provided for recording signals on and/or reproducing signals from a record bearing medium. The drive means relatively rotates the head means and the medium. The memory means is provided for storing information regarding the load condition on the drive means. The drive control means is arranged to control the speed and phase of the relative rotation between the head means and the medium on the basis of the information stored in the memory means.

In a preferred embodiment, the drive control means may include rotation control means and mode control means. The rotation control means controls the speed and phase of the relative rotation between the head means and the medium on the basis of the information stored in the memory means. Also, the rotation control means has a first operation mode for controlling speed and a second operation mode for controlling phase. The mode control means controls an operation mode of the rotation control means. The mode control means shifts the operation mode of the rotation control means from the first to the second mode when the relative rotation reaches a predetermined speed.

The apparatus may further comprise first and second power supply circuit means. The first power supply circuit means supplies power to at least the drive means. The second power supply circuit means supplies power to the memory means. The apparatus may further comprise switch means for controlling the first power supply circuit means. The memory means may be arranged to store renewed information on the load condition of the drive means before the first power supply circuit means terminates the power supply. The drive control means may include means for producing the information on the load condition of the drive means during the controlling of the drive means by the drive control means. Also, the memory means may be arranged to store the information produced by the producing means in the drive control means.

In addition to the above, the same arrangements explained in connection with the first and second aspects can be applied to the drive means, the rotation control means, mode control means and the apparatus itself.

Thus, with the feature of the first aspect of the present invention, even if a large phase fluctuation factor, such as an external disturbance, etc., is applied to the drive system, it is possible to quickly recover control of the relative rotation between the head means and the medium and to control the relative rotation with a good response and high phase synchronization precision. Moreover, it is possible to minimize the fluctuation of the rise rise time of the drive means at the time of starting.

Also, with the feature of the second aspect of the present invention, it is possible to keep or quickly recover control of the rotation of the medium irrespective of load fluctuation on the drive means due to the movement of the head means relative to the medium.

Here, in this specification, the term "movement of the head means relative to the medium" means not only the movement of the head means along the recording surface of the medium but also the movement of the head means toward and away from the recording surface of the medium.

Furthermore, with the feature of the third aspect of the present invention, it is possible to shorten the rise time of the drive means to phase synchronization.

The above and other aspects, features and advantages of the present invention will become apparent from the following detailed explanation of the preferred embodiments referring to the accompanied drawings.

DETAILED DESCRIPTION OF THE PREFERRED EMBODIMENTS

Figure 1:
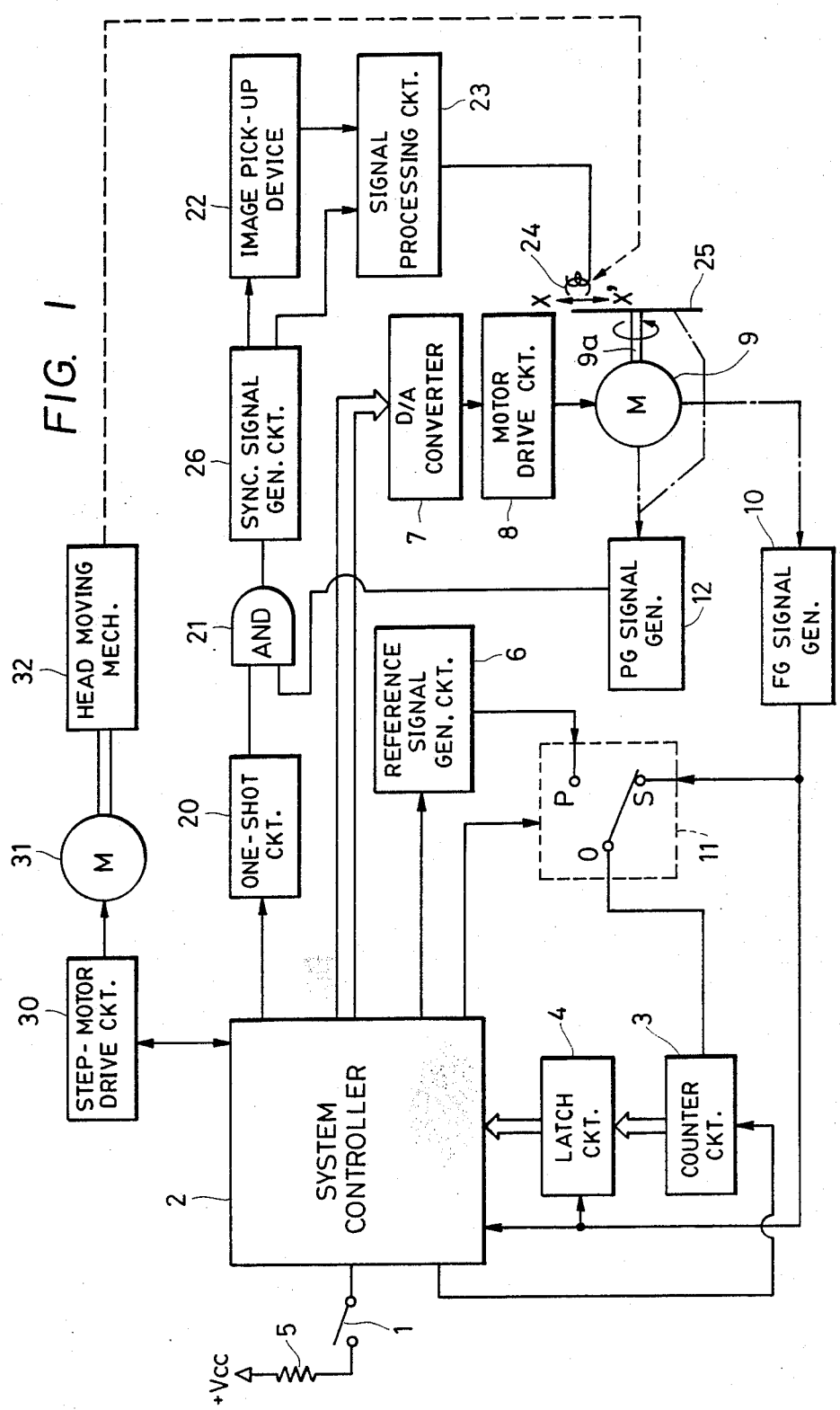
FIG. 1 is a block diagram showing an embodiment of the present inventon.
Figure 2A:
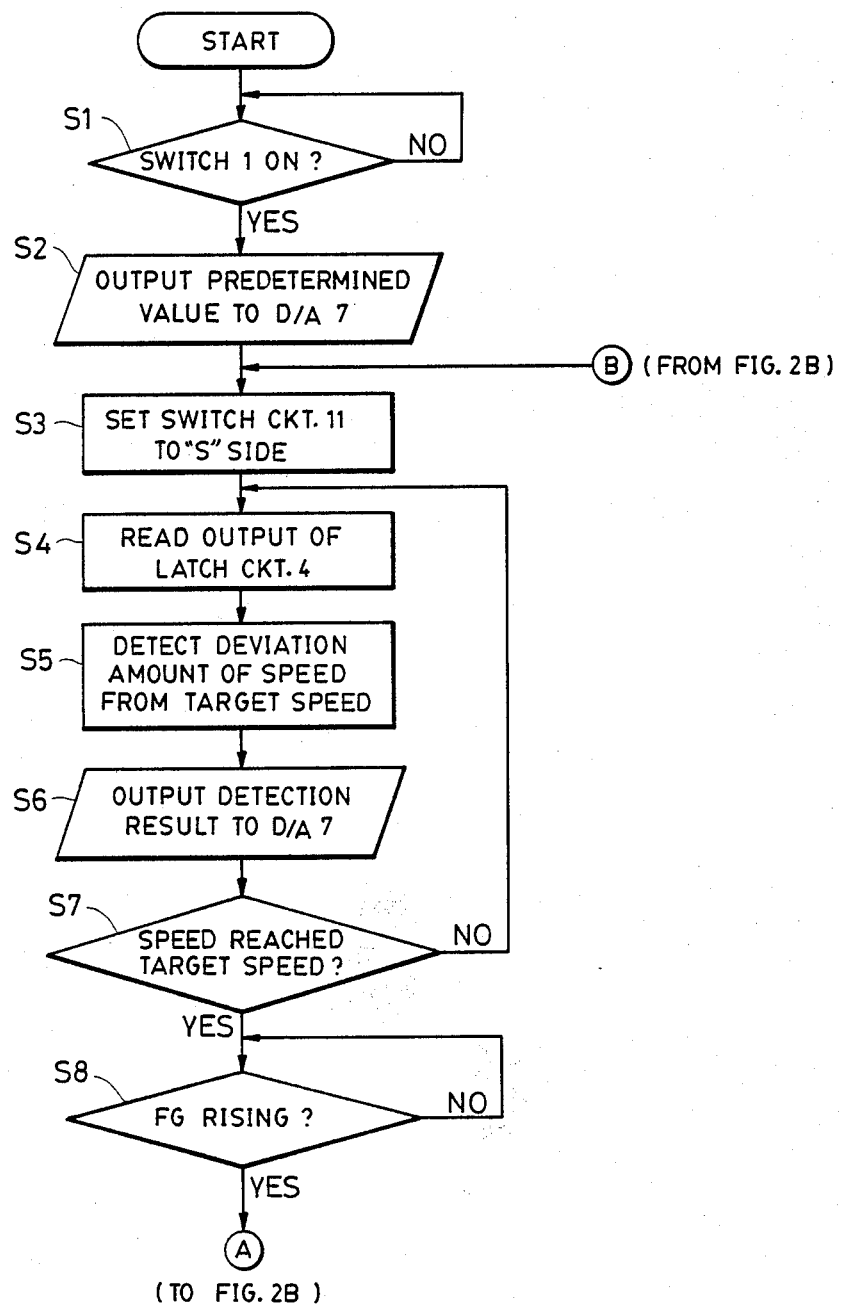
FIGS. 2A and 2B are flow charts showing the operation of the system controller of FIG. 1.
Figure 2B:
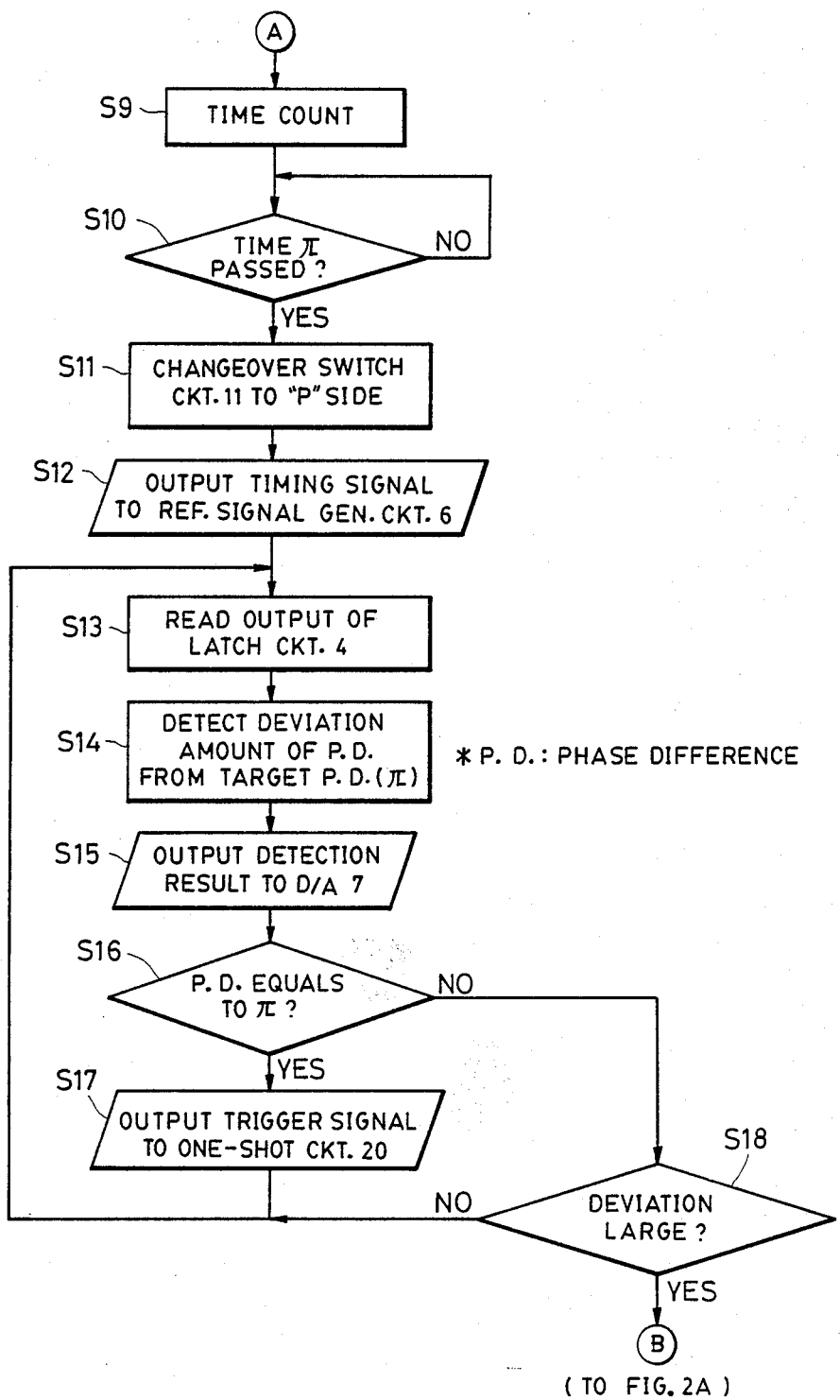

Referring to FIG. 1, there is shown a recording and reproducing apparatus for a still video recording camera using a magnetic disc as a record bearing medium and embodying the present invention. As shown, a switch 1 is connected to an electrical power source +Vcc through a resistor 5. A system controller 2 may be connected to the power source +Vcc through the switch 1. The controller 2 includes a CPU (Central Processing Unit), a ROM (Read Only Memory), a RAM (Random Access Memory), a clock signal generator, and counters, etc. A control program, represented by the flow charts of FIGS. 2A and 2B, is stored in the system controller ROM. A counter circuit 3 is connected to receive and count a clock signal supplied from the clock signal generator in the system controller 2. A latch circuit 4 is connected to receive and store the count output of the counter circuit 3 in response to the leading or rising edge of a pulse signal supplied from an FG signal generator 10. The latch circuit 4 is also connected to supply the stored count output to the system controller 2. A reference signal generation circuit 6 is connected to be controlled by a timing signal supplied from the system controller and to supply a reference signal having a fixed cycle to a first input terminal P of a change-over switch circuit 11. A digital to analog (D/A) converter 7 is connected to receive, and convert into an analog signal, a digital signal for motor control supplied from the system controller 2. A motor drive circuit 8 is connected to receive the analog signal for the motor control from the D/A converter 7 and is also connected to drive a motor 9. The motor 9 has a rotor shaft 9a to which a record bearing medium in the form of a magnetic disc 25 is fixed or mounted at its center. The FG signal generator 10 is operatively connected with the motor 9 to generate an FG signal indicative of the rotation speed of the rotor shaft 9a. The FG signal generator 10 can be arranged to generate as the FG signal, for example, 16 pulses for revolution of the rotor shaft 9a. The FG signal generator 10 is also connected to supply the FG signal to the system controller 2, the latch circuit 4 and a second input terminal S of the change-over switch 11. The change-over switch circuit 11 is connected to be controlled by a mode control signal supplied from the system controller 2. The changeover switch 11 also has a common output terminal O connected to the counter circuit 3 to supply thereto, as a reset signal, the FG signal supplied to the second input terminal S or the reference signal supplied to the first input terminal P. The counter circuit 3 is reset by the leading or rising edge of the supplied pulse signal.

A PG pulse signal generator 12 is operatively connected with the motor 9 to generate a PG pulse signal in synchronism with a specific rotation phase of the rotor shaft 9a, once during each revolution thereof. As is known in the art, the PG phase generator 12 can be arranged to be operatively connected with the disc 25 to generate the PG pulse signal in synchronism with a specific rotation phase of the disc 25, once during each revolution thereof. A retriggerable one-shot circuit (e.g. a retriggerable mono-stable multi-vibrator) 20 is connected to be controlled by a trigger signal supplied from the system controller 2 to generate, in response thereto, a one-shot pulse having a high level period longer than one, but shorter than two, cycles of the reference signal generated by the reference signal generation circuit 6. An AND gate 21 is connected to receive the output of the PG signal generator 12 and the output of the one-shot circuit 20. A synchronization signal generation circuit 26 is connected to receive the output of the AND gate 21 to generate, in response thereto, a synchronization signal. An image pick-up device 22 having a known construction, (e.g. a video camera) is connected to receive the synchronization signal generated by the synchronization signal generation circuit 26. A signal processing circuit 23 is connected to process the image signal output of the image pick-up device 22 into a recording signal based on the synchronization signal supplied from the synchronization signal generation circuit 26. A magnetic head 24 is connected to receive the recording signal from the signal processing circuit 23 to record the same on the recording surface of the disc 25.

Here, the synchronization signal is used not only for synchronized control of image pick-up by the image pick-up device 22, signal processing by the signal processing circuit 23 and driving of the disc 25 by the motor 9, but it is also used for signal processing in the signal processing circuit 23, e.g., adding of the blanking pulses to the image signal generated by the image pick-up device 22, etc. Furthermore, in the case where information on the disc 25 is to be reproduced, the synchronization signal may be used not only for synchronized control of the signal processing by a signal reproducing circuit and for driving of the disc 25 by a motor but it may also be used for signal processing in the reproducing circuit, e.g. clamping of the image signal, separation of the data signal from the image signal, etc. Accordingly, in this specification, the term "synchronization signal" means a signal for the synchronized control of the system and/or for the image signal processing in the recording and/or reproducing apparatus.

A step-motor drive circuit 30 is connected to be controlled by the system controller 2. A step-motor 31 is connected to be operated by the step-motor drive circuit 30. A head moving mechanism 32 having a known construction is connected to be driven by the step-motor 31 to move the head 24 along the recording surface of the disc 25 as is shown by arrows X—X'.

Next, the operation of the above described first embodiment will be explained with reference to FIGS. 1, 2A, 2B and 3.

When the switch 1 is switched on, i.e. closed, (S1 in FIG. 2A), the system controller 2 outputs to the D/A converter 7 a predetermined digital value for starting the motor 9 (S2 in FIG. 2A). The D/A converter 7 converts the supplied digital signal into a corresponding analog signal and supplies the same to the motor drive circuit 8. In response thereto, the motor drive circuit 8 activates the motor 9 to start driving the disc 25. Then the system controller 2 outputs the mode control signal to the change-over switch circuit 11 and sets the switch circuit 11 to connect its input terminal S (S3 in FIG. 2A). Thus, the counter circuit 3, which counts the clock signal supplied from the system controller 2, is reset by the leading or rising edge of the FG signal generated by the FG signal generator 10 in accordance with the rotation of the rotor shaft 9a of the motor 9. On the other hand, the latch circuit 4 stores, in response to the leading or rising edge of the FG signal, the count output of the counter circuit 3 before it is reset. Thus, the count output stored in the latch circuit 4 represents one cycle of the FG signal. The system controller 2 reads in the output of the latch circuit 4 in response to the leading or rising edge of the FG signal after the latch circuit 4 has stored the count output (S4 in FIG. 2A) and compares the output of the latch circuit 4 with a predetermined value which represents one cycle of the FG signal upon reaching a predetermined target speed, to detect a deviation amount of the current rotation speed from the target speed (S5 in FIG. 2A). Then the system controller 2 outputs to the D/A converter 7, in the form of the digital signal, the detection result to eliminate the deviation (S6 in FIG. 2A). The system controller 2 then checks whether the rotation speed has reached the predetermined target speed (S7 in FIG. 2A). If the rotation speed has not reached the target speed, the system controller 2 goes back to step S4. Thus, by repetition of steps S4 to S7, the rotation speed of the rotor shaft 9a, and hence that of the disc 25, is controlled at the predetermined speed.

If the apparatus is designed so that one TV field signal according to the NTSC system is recorded by one revolution of the disc 25, the disc 25 should be rotated at 3,600 r.p.m. In this case, the predetermined value with which the output of the latch circuit 4 is compared at the step S5 represents one cycle of the FG signal at reaching the rotation speed of 3,600 r.p.m., which can be expressed by: $60^{-1} \times$ (number of cycles of FG signal per one revolution of rotor shaft $9a)^{-1}$ [sec.] Accordingly, if the FG signal generator 10 is arranged to generate as the FG signal 16 pulses per one revolution of the rotor shaft 9a, the target one cycle of the FG signal becomes:

$$60^{-1} \times 16^{-1} = 1/960 \text{ [sec.]}$$

The system controller 2 stores the predetermined value representing the target cycle of the FG signal upon reaching the predetermined target speed; and, at the step S7, the system controller 2 regards the rotation speed as having reached the predetermined speed when the deviation of the output of the latch circuit 4 from the predetermined value becomes within a predetermined deviation amount of range, for example, ±10% of the predetermined value. If the deviation of the output of the latch circuit 4 from the predetermined value comes within the predetermined deviation amount or range, the system controller 2 goes to step S8, and if not, the system controller 2 goes back to step S4.

Figure 3:
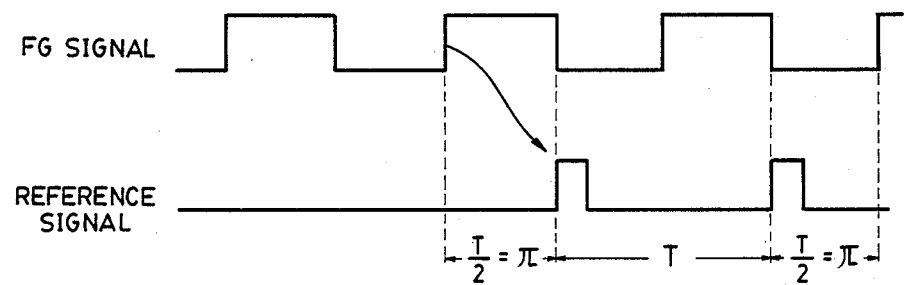
FIG. 3 is a timing chart showing a timing relationship between an FG signal and a periodic reference signal generated in the apparatus shown in FIG. 1.

At step S8, the system controller 2 detects the leading or rising edge of the FG signal; and, in response thereto, starts a time count in the internal counter (S9 in FIG. 2B). Then the system controller 2 checks whether a predetermined time represented by $\pi$ has passed from the start of the time count (S10 in FIG. 2B). The waiting time represented by $\pi$ corresponds to T/2, where T corresponds to one cycle of the FG signal at reaching the predetermined target speed. When the predetermined time represented by $\pi$ has passed (S10 in FIG. 2B), the system controller 2 outputs the mode control signal to the switch circuit 11 and sets the same to connect its input terminal P (that is the phase control mode—S11 in FIG. 2B). Also, the system controller 2 outputs to the reference signal generation circuit 6 the timing signal having a phase delay corresponding to $T/2=\pi$ relative to the FG signal (S12 in FIG. 2B). Here, the reference signal generation circuit 6 is arranged to generate the reference signal having a fixed cycle corresponding to T in response to the timing signal. Thus, as is shown in FIG. 3, the reference signal generation circuit 6 begins to generate the reference signal having a fixed cycle T and a phase delay of $T/2=\pi$ relative to the FG signal.

By switching the switch circuit 11 from its input terminal S to its input terminal P (S11 in FIG. 2B), the counter circuit 3 is controlled to be reset by the leading or rising edge of the reference signal generated by the reference signal generation circuit 6. On the other hand, the latch circuit 4 stores the count output of the counter circuit 3 in response to the leading or rising edge of the FG signal generated by the FG signal generator 10. Thus, as is understood from FIG. 3, the output of the latch circuit 4 represents the phase difference (P.D.) between the reference signal and the FG signal. The system controller 2 reads in the output of the latch circuit 4 in response to the leading or rising edge of the FG signal after the latch circuit 4 has stored the count output (S13 in FIG. 2B) and compares the output of the latch circuit 4 with a predetermined value representing $\pi = T/2$, to detect a deviation amount of the phase difference between the reference signal and the FG signal from the target phase difference $\pi$ (S14 in FIG. 2B). Then the system controller 2 outputs to the D/A converter 7 in the form of the digital signal the detection result to eliminate the deviation from the target phase difference (S15 in FIG. 2B). The system controller 2 then checks whether the phase difference of the FG signal from the reference signal becomes $\pi = T/2$ (S16 in FIG. 2B). If the phase difference is substantially equal to $\pi$, the system controller 2 outputs the trigger signal to the retriggerable one-shot circuit 20 (S17 in FIG. 2B) and then goes back to the step S13. In response to the trigger signal, the one-shot circuit 20 produces the one-shot pulse having the high level period longer than T but shorter than 2T. On the other hand, if the phase difference between the FG signal and the reference signal is kept to be substantially equal to $\pi$, the system controller 2 again triggers the one-shot circuit 20 before the output of the one-shot circuit 20 changes to the low level at the step S17 in the next phase control cycle (S13–S17). Thus, as long as the phase difference between the FG signal and the reference signal is kept to be substantially equal to $\pi$, the one-shot circuit 20 continues to produce a high level output. On the other hand, the PG signal generator 12 generates the PG signal in synchronism with the specific rotation phase of the motor shaft 9a, once per revolution of the motor shaft 9a. Thus, the AND gate 21 receives the outputs of the one-shot circuit 20 and the outputs of the PG generator 12 and produces the PG signal after the phase difference between the PG signal and the reference signal becomes substantially equal to $\pi$. In response to the PG signal output from the AND gate 21, the synchronization signal generation circuit 26 generates the synchronization signal which is supplied to the image pick-up device 22 and to the signal processing circuit 23.

Here, the system controller 2 determines, at the step 16, the phase difference between the FG signal and the reference signal have become equal to $\pi$ when the deviation of the phase difference from $\pi$ becomes within a predetermined deviation amount of range, for example, $\pm \pi/50$. If the deviation of the phase difference between the FG signal and the reference signal from 6 comes within the predetermined deviation amount of range, the system controller 2 goes to the step S17, and if not, it goes to step S18. At the step S18, the system controller 2 checks whether the deviation of the phase difference between the FG signal and the reference signal from 6 exceeds a predetermined limit value, for example, $\pi/5$, that is 10 times the above mentioned deviation amount of $\pi/50$. If the deviation does not exceed the limit value. The system controller 2 goes to the step S13. If the deviation does exceed the limit value, the system controller 2 goes to the step S3 in FIG. 2A to restart from the speed control.

The reason why the control is restarted from the speed control when the deviation exceeds the limit, is as follows: If the deviation exceeds the limit value, the control becomes unstable and, if phase controlling should be continued, considerable time would be required to bring the disc rotation speed back to the precise speed required for signal recording. However, it is possible to recover proper rotational speed in a shorter time by restarting from the speed control rather than by continuing the phase control. Thus, by restarting from the speed control, a quick recovery can be obtained.

Figure 4:
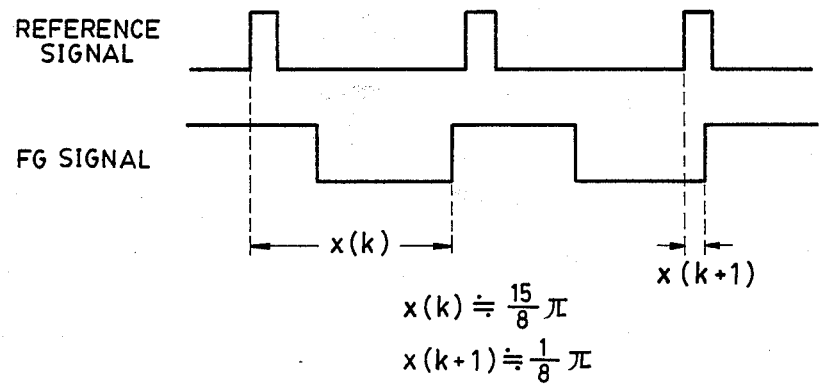
FIG. 4 is a timing chart showing a timing relationship between the FG signal and the periodic reference signal generated in a modification of the apparatus of FIG. 1.

In the above described embodiment, the phase control target is determined so that the phase difference between the FG signal and the reference signal becomes $\pi(=T/2)$. However, it might happen that due to the fluctuation of the load on the motor 9 during one cycle of the FG signal, the actual initial phase difference between the FG signal and the reference signal does not become $\pi$, even though the reference signal generation circuit 6 is triggered at a time when the time $\pi=T/2$ has passed from the leading or rising edge of the FG signal at the time of mode changing from speed control to phase control. If this should occur, the phase difference must later be controlled or adjusted at $\pi$. In view of the above, the initial phase difference after the triggering of the reference signal generation circuit 6 at the step S12 may be used as the phase control target and the rotation may be controlled so that the initial phase difference is kept unchanged. With this method, it is possible to shorten the time necessary from the phase synchronization. In this case, however, the determination of the target phase difference is not arbitrary but should be set at least at a value near $\pi$. Namely, if the initial phase difference differs substantially from $\pi$, (e.g. O or $2\pi$, it will be necessary to set the phase control target at $\pi$ and to control or adjust the phase difference at $\pi$. Because, in case the target phase difference is set at a value near O or $2\pi$, for example, at 15 $\pi/8$ as shown in FIG. 4, if the phase of the FG signal further deviates from that of the reference signal by more than $\pi/8$, the count output stored in the latch circuit 4 becomes less than $\pi/8$. This makes the later control very difficult, since though the actual phase delay is increased from $15\pi/8$ by more than $\pi/8$, it is regarded, on the control, that the phase delay is decreased from 15 $\pi/8$ to less than $\pi/8$. Therefore, it is preferred to set the phase control target at a value with which the actual phase difference does not go below O or over $2\pi$, that is, for example, $\pi$ as in the present embodiment, or a value at least near $\pi$.

Figure 5:
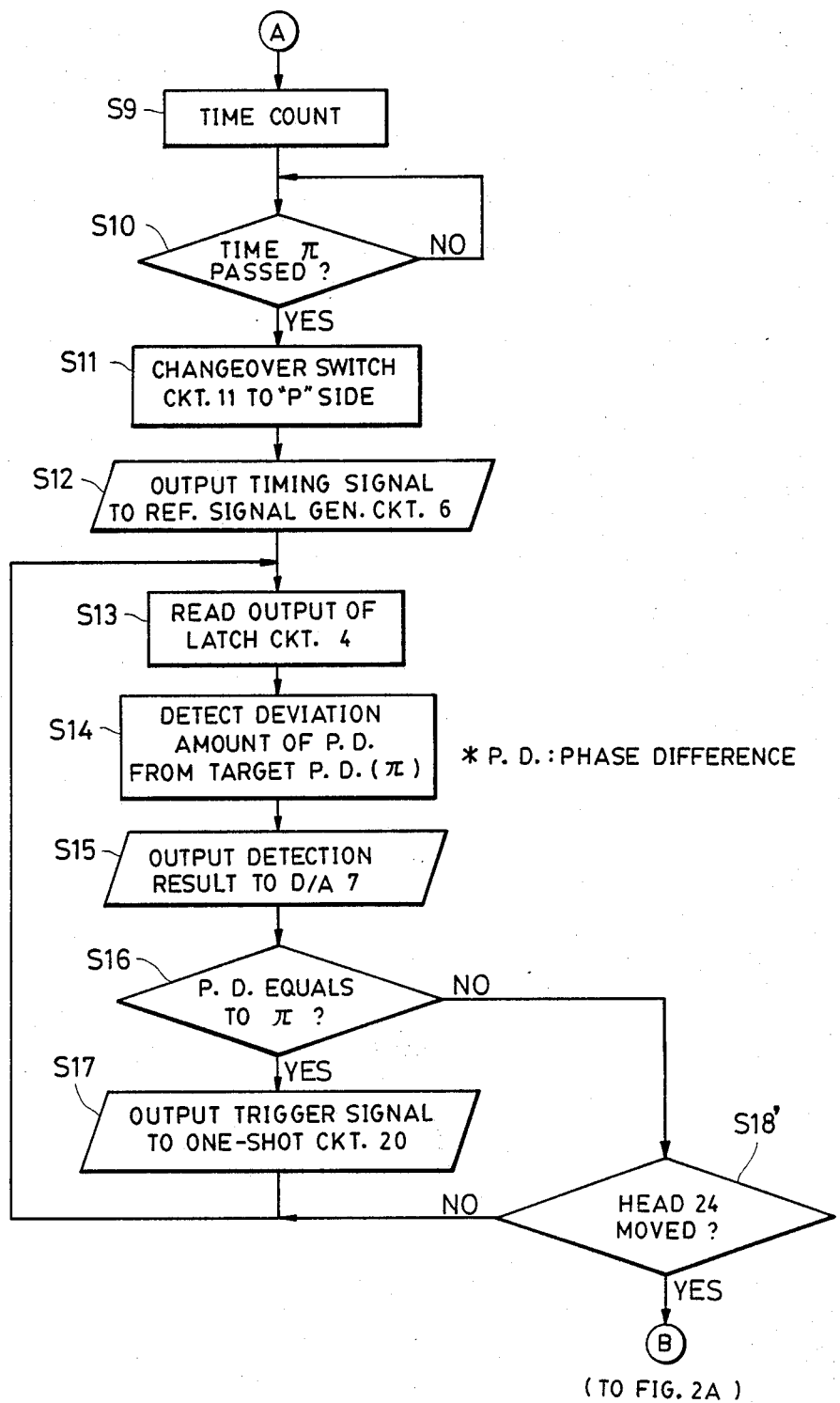
FIGS. 5 and 6 are flow charts showing, respectively, the operation of a system controller according to a second embodiment and a modification thereof, respectively.
Figure 6:
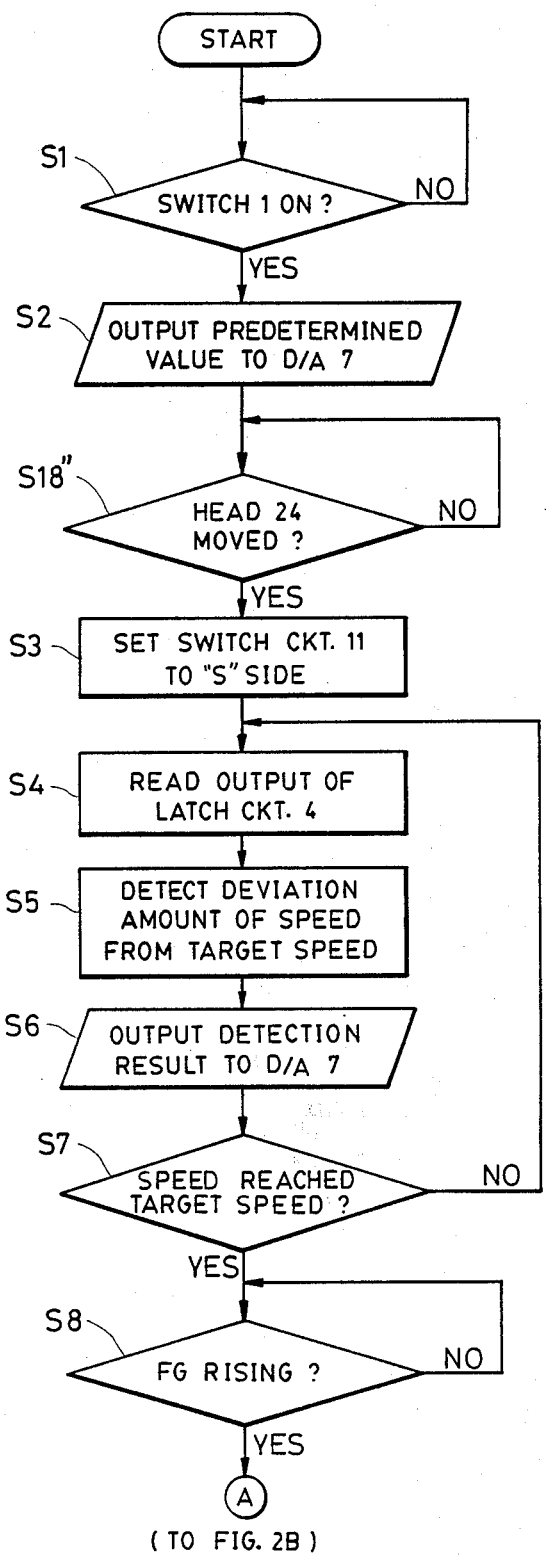

Next, a second embodiment will be explained with reference to FIGS. 1, 5 and 6. In the second embodiment, the rotation control of the motor 9 is restarted or started from the speed control in response to the movement of the head 24.

In FIG. 1, the system controller 2 commands the step-motor drive circuit 30 to drive the step motor 31 in order to move the head 24 to a recording position on the disc 25 before or after the recording. The system controller 2 also checks whether the head 24 is or has been so moved; and if yes, it sets or resets the rotation control mode at the speed control mode. For example, as is shown in FIG. 5 (which corresponds to FIG. 2B), instead of checking whether the deviation of the phase difference between the FG signal and the reference signal from $\pi$ (target phase difference) exceeds the predetermined limit value (at the step S18 in FIG. 2B), the system controller 2 may check whether the head 24 is or has been moved (S18 in FIG. 5). If yes, the system controller 2 goes to the step S3 in FIG. 2A, but if not, the system controller 2 goes to the step S13. Alternatively, as is shown in FIG. 6 (which corresponds to FIG. 2A), the system controller 2 may check whether the head 24 is or has been moved (S18" in FIG. 6) after the step 2. If yes in such case, the system controller 2 goes to the next step S3. It should be noted that before the step S9 in FIG. 5, the steps S1 to S8 shown in FIG. 2A are applicable and after the step S8 in FIG. 6, the steps S9 to S17 shown in FIG. 2B are applicable. In the latter case, the system controller 2 is arranged to go to the step 13 if the answer at the step S16 is negative. The mode of operation shown in FIG. 5 is suited for the system in which the head 24 is moved to the recording portion before or after the recording, and the mode of operation shown in FIG. 6 is suited for the system in which the head 24 is moved to the recording position before the recording.

Generally, when the head 24 is moved relative to the disc 25, a large fluctuation in phase may occur due to changes in the load. Also, with the second embodiment of the present invention, it is possible to set or reset the control mode at the speed control mode without necessarily calling for the detection of the amount of phase deviation. Next, a third embodiment of the present invention will be explained with reference to FIGS. 7, 8A and 8B.

Figure 7:
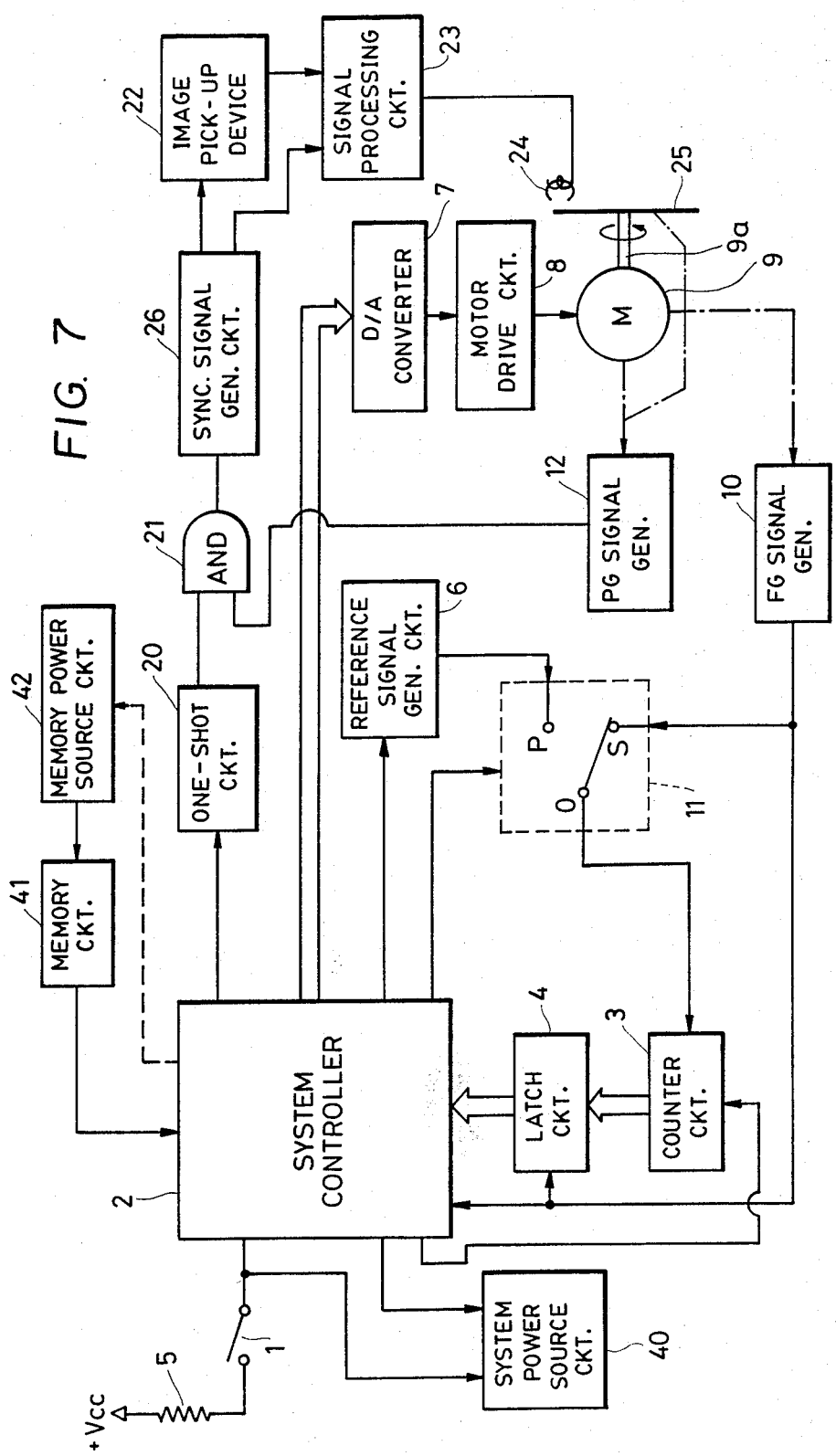
FIG. 7 is a block diagram showing another embodiment of the present invention.

In FIG. 7, a system power source circuit 40 of self-holding type is connected to be controlled by the switch 1 and by the system controller 2, and to supply power to the system shown in FIG. 7. The self-holding operation of the power source circuit 40 is controlled by command signals supplied from the system controller 2. A memory 41 is connected to receive and store information on the condition of the load to the motor 9 (motor parameter), output from the system controller 2. As the memory 41, a static RAM may be used. A memory power source circuit 42 is connected to supply power to the memory 41. This power supply circuit 42 is provided for continuing the power supply to the memory 41 to retain the information stored therein even after the power supply to the system from the power source circuit 40 is cut off.

The construction of the embodiment of FIG. 7, other than as described above, is the same as that of FIG. 1.

Figure 8A:
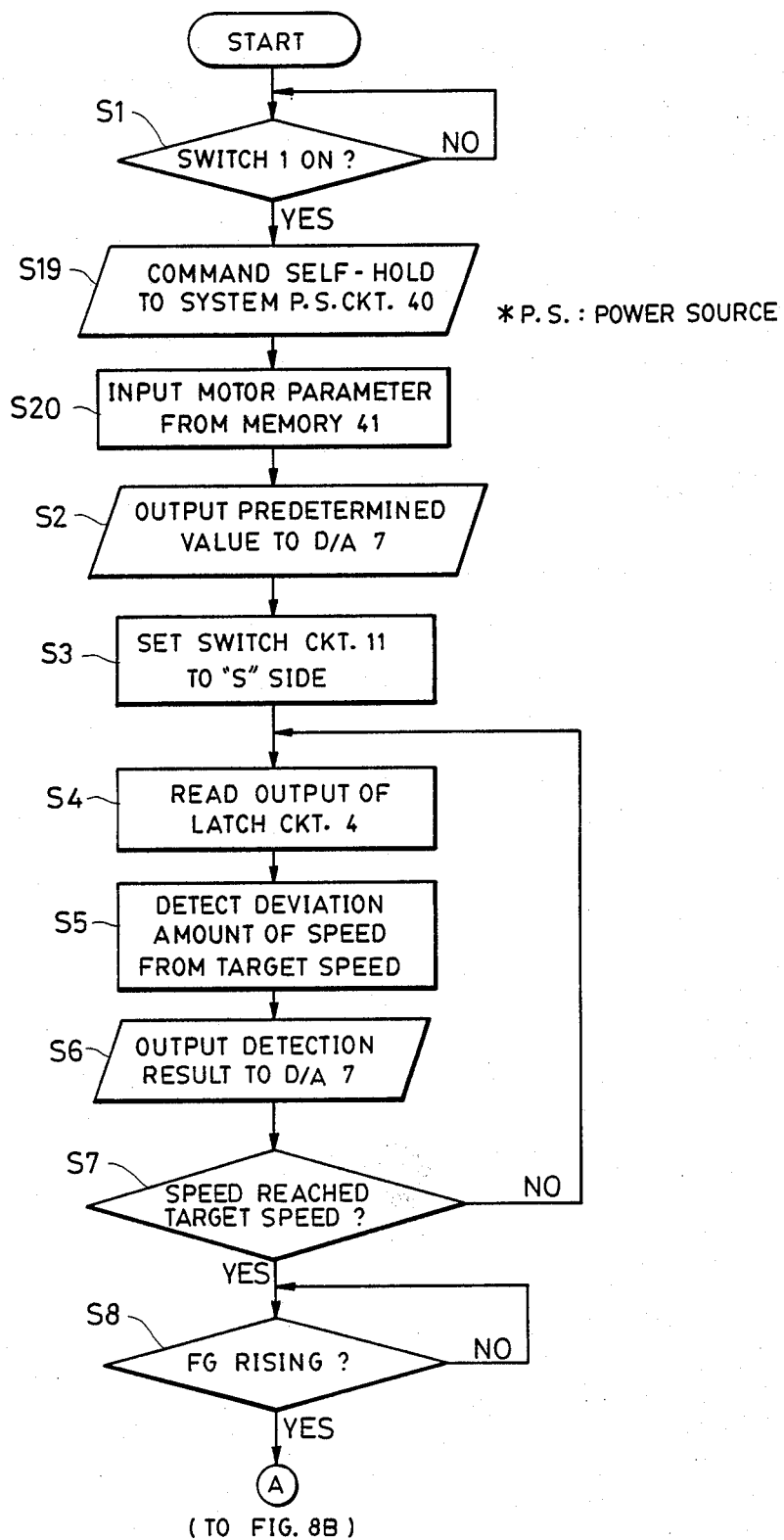
FIGS. 8A and 8B are flow charts showing the operation of a system controller shown in FIG. 7.
Figure 8B:
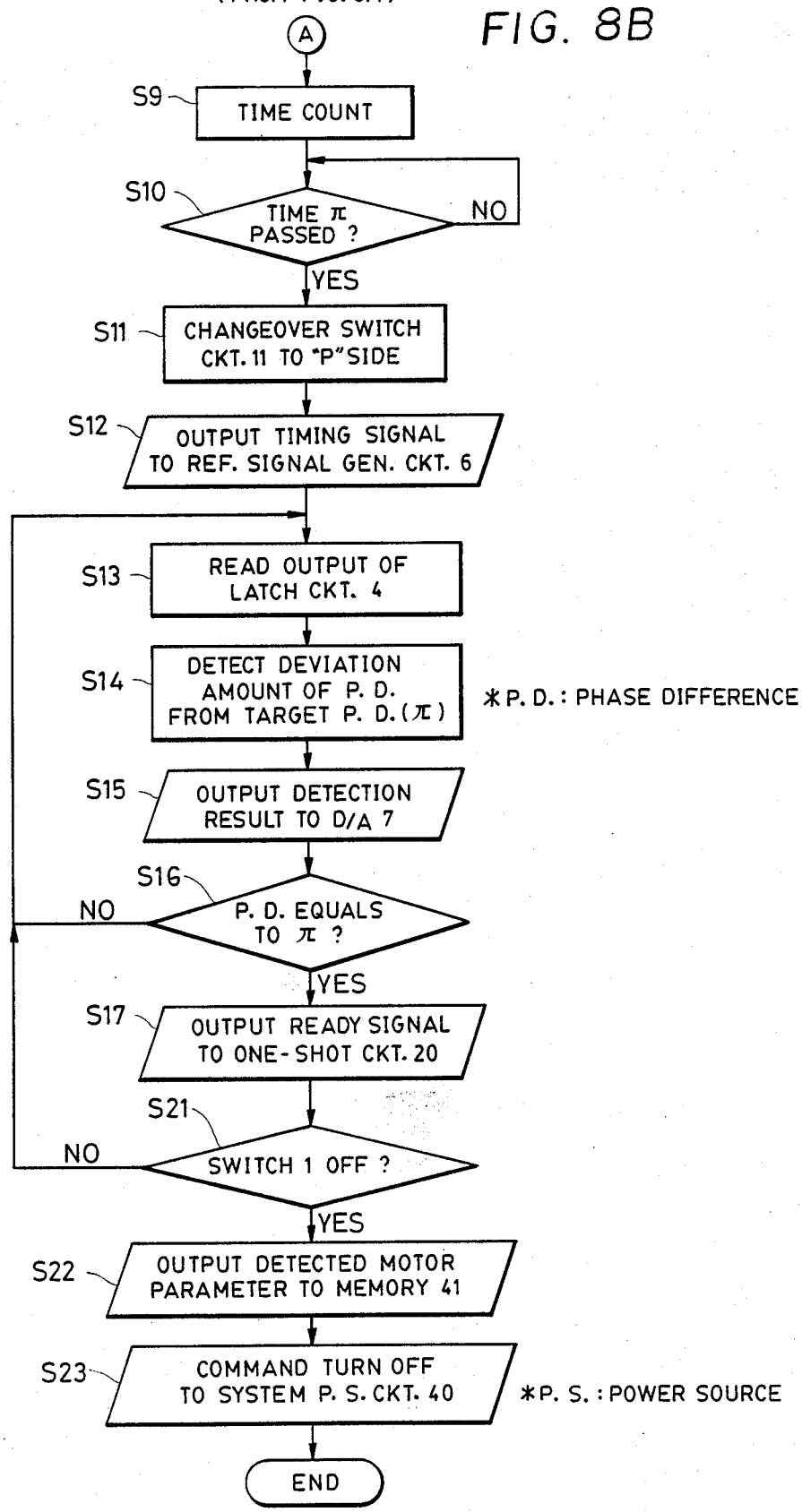

In the embodiment of FIG. 7, the system controller 2 controls the operation of the system in accordance with the flow charts of FIGS. 8A and 8B. In FIGS. 8A and 8B, the steps S1 to S17 are substantially the same as those in FIGS. 2A and 2B.

When the switch 1 is turned on (S1 in FIG. 8A), the system power source circuit 40 is turned on and and the system controller 2 outputs to the system power source circuit 40 a control signal commanding the self-holding of the turn-on state (S19 in FIG. 8A). Then the system controller 2 reads in the stored information on the condition of load to the motor 9 (the motor parameter) from the memory 41 (S20 in FIG. 8A) and goes to step S2. After step S3, the system controller 2 controls the rotation speed of the motor 9 in steps S4 to S7. That is, in this embodiment, the system controller 2 corrects, at the step S5 or S6, the detected deviation amount of the speed with the motor parameter read in from the memory 41 at the step S20.

When the rotation speed of the motor 9 has reached the predetermined speed (S7 in FIG. 8A), the system controller 2 goes to the phase control mode, including the steps S13 to S16, via the steps S8 to S12. Here, in this embodiment, the system controller 2 corrects at the step S14 or S15 the detected deviation amount of the phase difference (P.D.) between the FG signal and the reference signal from the target phase difference $\pi$, with the motor parameter read in from the memory 41 at the step S20 in FIG. 8A. The system controller 2 repeats the steps S13 to S16 until the phase difference becomes substantially equal to $\pi$. And when the phase difference becomes substantially equal to $\pi$, the system controller 2 advances via the step S17 to a step 21 where the system controller 2 checks as to whether the switch 1 is turned off. If the switch 1 is not yet turned off, the system controller 2 goes back to the step S13; but if the switch 1 is turned off, the system controller 2 outputs to the memory 41 a newly detected motor parameter to cause the memory 41 to store the renewed information (S22 in FIG. 8B). Then the system controller 2 outputs to the system power source circuit 40 a control signal commanding the cutting off of the power supply (S23 in FIG. 8B). Here, in this embodiment, the system controller 2 is arranged to calculate, during the rotation control, the integrated value of the phase deviation amount in the third term of the about mentioned formula (1) and to output the same to the memory 41 as the renewed information on the condition of the load to the motor 9, that is, the renewed motor parameter, together with a write-in command signal at step S22 when detecting the turning off of the switch 1. Thus, the memory 41 stores the supplied renewed information at the step 22 and retains the stored information even after the turning off of the system power source circuit 40, by being supplied with the power from the memory power source circuit 42. This renewed information stored and retained in the memory 41 is used for the next rotation controlling operation.

As is explained in the foregoing with reference to the formula (1), the integrated value of the phase deviation amount in the formula (1) increases when the load increases due to changes in environmental conditions, and conversely, it decreases when the load decreases. On the other hand, the time constant necessary for the integration of the phase deviation amount is determined by the constant G3 in the formula (1); and, in order to maintain stability of control, it cannot be set at a very small value. Accordingly, a relatively long time is needed from the start of the motor 9 until the integration value is determined. Also, during this time, the speed and the phase of the motor 9 have offsets from their respective target values. Thus, as a result, the a long time is required to achieve phase synchronization. However, in the normal situation of usage of the apparatus, environmental conditions such as temperature, humidity, or the like, should not change suddenly, and hence, it can be regarded that there is no big change in the condition of the load to the motor 9 when the system power source circuit 40 is turned on again after it has been turned off. Accordingly, by retaining in the memory 41 the information on the condition of the load to the motor 9, for example, the integrated value of the phase deviation amount at the time of turning off of the system power source circuit 40 and using the information retained in the memory 41 as an intial value at the time of turning on the system power source circuit 41, the required control amount can be obtained in a short time. Thus, if there is no substantial change in the environmental conditions, it is possible to greatly shorten the required time to phase synchronization at the time of the next activation of the motor 9.

Of course, it might occur that with use of the information retained in the memory 41 as the initial value, the required time for determination of the required control amount would be lengthened rather than shortened. This may occur for example, if there should be a large change in the environmental conditions between the time when the information has been stored in the memory 41 and the time when the information retained in the memory 41 is to be used. In view of this, the memory power source circuit 42 may be arranged to cut off the power supply to the memory 41 to clear off its content when a predetermined time passed after the memory 41 has stored the information. For example, the memory power source circuit 42 may include a timer to automatically cut off the power supply to the memory 41 when such predetermined time has passes. This timer can be arranged to be set by the system controller 2 at the step S22 or S23 in FIG. 8B, as is shown by a dotted line in FIG. 7. Alternatively, the memory power source circuit 42 may comprise a capacitor having a necessary capacitance as the back-up power source; and it may be arranged to be operated for the memory 41 instead of the system power source circuit 40 by the system con-troller controller 2 at the step S22 or S23 in FIG. 8B.

In the above described embodiments, the phase control of the motor 9 is performed based on the FG signal which includes plural pulses, for example, 16 pulses per revolution of the motor shaft 9a; and therefore, phase synchronization with a shorter rising time an higher accuracy can be achieved than by the phase control based on, for example, a PG signal which includes one pulse per revolution of the motor shaft 9a. Moreover, since the reference signal for the phase control is generated based on the FG signal and then the FG signal is compared with the reference signal for the phase control, the rising time till the phase synchronization can be considerably shortened. Furthermore, after completion of the phase control of the motor 9, the synchronization signal generation circuit 26 is controlled to synchronize in phase with the rotation of the motor shaft 9a or the disc 25, and therefore, the time required for the synchronization of the whole system can be greatly shortened.

As a modification of the synchronization signal generation system shown in FIGS. 1 and 7, a synchronization signal generation circuit of self-exciting type may be used for the circuit 26. In such a case, the generation circuit (26) necessitates only one trigger pulse for its synchronous operation, and therefore, the one-shot circuit 20 may be replaced with a normal one-shot circuit or mono-stable multi-vibrator which is arranged to produce in response to one trigger, a pulse signal having a high level period longer than one, but shorter than two, cycles of the rotation of the motor shaft 9a.

Although the above described embodiments of the present invention relate to a still video recording camera, the present invention is no doubt applicable to other reproducing apparatus as well as to recording and reproducing apparatus. For example, in case of a reproducing apparatus, the signal processing circuit 23 in FIGS. 1 and 7 may be replaced with any known signal reproducing circuit. In such case the image pick-up device 22 is not used. On the other hand, in the case of a recording and reproducing apparatus, the signal processing circuit 23 may be replaced with any known recording and reproducing circuit which is switchable between its recording mode and its reproducing mode. In the latter case, the system controller 2 may be arranged to control the mode changing between the recording an the reproducing as well as the head movement for the signal picking up from the disc 25 in the reproducing mode.

Moreover, the present invention is well applicable to the recording and/or reproducing apparatus using other types of record bearing medium, for example, an optical disc an electrostatic capacitive disc or drum, etc.

Furthermore, the present invention is also applicable to recording and/or reproducing apparatus of the type in which the recording and/or reproducing head is rotated relative to the record bearing medium. Such apparatus include, for example, VCR and rotary head type disc or drum recording and/or reproducing apparatus, etc.

As can be appreciated from foregoing description, according to the present invention, it is generally possible to quickly achieve control of the relative rotation between the head means and the medium and to control the relative rotation with high accuracy. Thus, the present invention is suited particularly to, but is not limited to, apparatus having a drive system with low inertia, such as a still video recording and/or reproducing apparatus using a disc shaped magnetic sheet as the medium.

The present invention, as is indicated above, need not necessarily be restricted to the above described embodiments but many modifications and applications can be made within the scope of the invention claimed in appended claims.

What is claimed is:

1. A recording and/or reproducing apparatus comprising:
    (A) head means for recording signals on and/or reproducing signals from a record bearing medium;
    (B) drive means for relatively rotating said head means and the medium;
    (C) memory means for storing information corresponding to the load condition on said drive means;
    (D) holding means for holding said information on a condition of a load to said drive means while said drive means is inoperative; and
    (E) drive control means for controlling the speed and phase of the relative rotation between said head means and the medium on the basis of the information stored in said memory means at least when said drive means starts to operate.

2. Apparatus according to claim 1, wherein said drive control means includes:
    rotation control means for controlling the speed and the phase of the relative rotation on the basis of the information stored in said memory means, said rotation control means having a first operation mode for controlling the speed and a second operation mode for controlling the phase; and
    mode control means for controlling an operation mode of said rotation control means, said mode control means being arranged to shift the operation mode of said rotation control means from the first to the second mode when the relative rotation reaches a predetermined speed.

3. Apparatus according to claim 2, further comprising switch means operative to cause said drive means to operate;
    said mode control means being further arranged to set the operation mode of said rotation control means at the first mode in response to operation of said switch means.

4. Apparatus according to claim 3, wherein said drive means has means for generating a rotation speed signal indicative of the speed of the relative rotation between said head means and the medium;
    and wherein said rotation control means includes:
    first means for generating a reference signal for the phase controlling; and
    second means for controlling the speed and the phase of the relative rotation between said head means and the medium, said second means being arranged to control the speed, in the first mode, on the basis of the information stored in said memory means and the rotation speed signal and to control the phase, in the second mode, on the basis of the information stored in said memory means, the rotation speed signal and the reference signal;
    said mode control means being arranged to control the operation mode of said second means.

5. Apparatus according to claim 4, wherein said mode control means is further arranged to operate said first means to generate the reference signal when the relative rotation has reached the predetermined speed.

6. Apparatus according to claim 5, wherein said mode control means is arranged to operate said first means to generate the reference signal in response to the rotation speed signal.

7. Apparatus according to claim 4, further comprising:

signal processing means for processing an input signal into a recording signal and/or a reproducing signal on the basis of a synchronization signal; and synchronization signal generation means for generating the synchronization signal on the basis of the relative rotation between said head means and the medium;

said mode control means being further arranged to operate said synchronization signal generation means to generate the synchronization signal when the rotation speed signal becomes substantially synchronized with the reference signal.

8. Apparatus according to claim 7, wherein said synchronization signal generation means is arranged to generate the synchronization signal in synchronism with a specific phase of the relative rotation.

9. Apparatus according to claim 8, wherein said synchronization signal generation means includes:

detection means for detecting the specific phase of the relative rotation and for generating a detection signal in response thereto;

gate means for selectively passing therethrough the detection signal generated by said detection means; and signal generation circuit means for generating the synchronization signal in response to the detection signal output from said gate means;

said mode control means being arranged to cause said gate means to pass the detection signal therethrough when the rotation speed signal is substantially synchronized with the reference signal.

10. Apparatus according to claim 1, further comprising:

signal processing means for processing an input signal into a recording signal and/or a reproducing signal on the basis of a synchronization signal; and synchronization signal generation means for generating the synchronization signal on the basis of the relative rotation between said head means and the medium.

11. Apparatus according to claim 10, wherein said synchronization signal generation means is arranged to generate the synchronization signal in synchronism with a specific phase of the relative rotation.

12. Apparatus according to claim 11, wherein said synchronization signal generation means includes:

detection means for detecting the specific phase of the relative rotation and for producing a detection signal in response thereto; and signal generation circuit means for producing the synchronization signal in response to the detection signal.

13. Apparatus according to claim 1, further comprising:

first power supply circuit means for supplying power to at least said drive means; and second power supply circuit means for supplying power to said memory means.

14. Apparatus according to claim 13, wherein said memory means is arranged to store renewed information on the condition of the load on said drive means before said first power supply circuit means terminates the power supply.

15. Apparatus according to claim 14 wherein said drive control means includes means for producing information on the condition of the load on said drive means during the controlling of said drive means by said drive control means;

and wherein said memory means is arranged to store the information produced by said producing means in said drive control means.

16. A recording and/or reproducing apparatus for use with a magnetic disc comprising:

(A) a magnetic head to record signals on and/or to reproduce signals from the disc;

(B) a motor arranged to rotate the disc;

(C) a memory circuit for storing the information regarding the load condition said motor;

(D) holding means for holding said information on a condition of a load to said motor while said motor is inoperative, and (E) a control circuit for controlling said motor, said control circuit including rotation control means for controlling the rotation speed and a rotation phase of the disc on the basis of the information stored in said memory means at least when said motor is started to operate.

17. Apparatus according to claim 16, wherein said rotation control means has a first operation mode for controlling the speed and a second operation mode for controlling the phase;

and wherein said control circuit further includes mode control means for controlling an operation mode for said rotation control means, said mode control means being arranged to shift the operation mode of said rotation control means from the first to the second mode when the rotation of the disc has reached a predetermined speed.

18. Apparatus according to claim 17, further comprising:

a switch operative to cause said motor to operate;

said mode control means being further arranged to start said rotation control means from the first mode in response to operation of said switch.

19. Apparatus according to claim 17 further comprising:

a signal processing circuit connected to said head for processing an input signal into a recording signal and/or a reproducing signal on the basis of a synchronization signal; and synchronization signal generation means for generating the synchronization signal on the basis of the rotation of the disc.

20. Apparatus according to claim 19, wherein said synchronization signal generation means includes:

a detection circuit for detecting the rotation phase of the disc and for generating a pulse signal in response thereto; and signal generation circuit means for generating the synchronization signal in response to the pulse signal.

21. Apparatus according to claim 20, wherein said mode control means is further arranged to cause said signal generation circuit means to respond to the pulse signal when the rotation phase of the disc becomes substantially synchronized with a predetermined phase reference.

22. Apparatus according to claim 16, further comprising:

a first power supply circuit for supplying power to at least said motor; and a second power supply circuit for supplying power to said memory circuit.

23. Apparatus according to claim 22, wherein said memory circuit is arranged to store renewed information on the condition of the load to said motor before said first power supply circuit terminates the power supply.

24. Apparatus according to claim 23, wherein said control circuit includes means for producing information on the condition of the load on said motor during the control of said motor by said control circuit;
and wherein said memory circuit is arranged to store the information produced by said producing means in said control circuit.

25. Apparatus comprising:
(a) drive means for rotating a rotatable member;
(b) memory means for storing information corresponding to the load condition on said drive means, and for maintaining said information after said drive means becomes inoperative; and
(c) drive control means for controlling rotating state of said drive means on the basis of the information stored in said memory means at least when said drive means becomes inoperative.

26. Apparatus according to claim 25, further comprising:
switching means for switching said drive means between a first operation mode for causing said rotatable member to rotate and a second operation mode for not causing said rotatable member to rotate;
said drive control means controlling rotating state of drive means on the basis of said information in response to the switching from the second operation mode to the first operation mode by said switch means.

27. Apparatus according to claim 25, wherein said rotating state is a rotating speed.

* * * * *

UNITED STATES PATENT AND TRADEMARK OFFICE
CERTIFICATE OF CORRECTION

PATENT NO. : 4,816,937

DATED : March 28, 1989

INVENTOR(S) : Nobuo Fukushima

It is certified that error appears in the above-identified patent and that said Letters Patent is hereby corrected as shown below:

COLUMN 1:

Line 12, delete "bearing" (second occurrence).

COLUMN 2:

Line 28, change "necesary" to --necessary--.

Line 68, change "aparatus" to --apparatus--.

COLUMN 3:

Line 24, change "include for" to --include means for--.

COLUMN 4:

Line 10, delete "a".

Line 62, delete "rise" (second occurrence).

COLUMN 5:

Line 59, change "controller" to --controller 2--.

UNITED STATES PATENT AND TRADEMARK OFFICE
CERTIFICATE OF CORRECTION

PATENT NO. : 4,816,937
DATED : March 28, 1989
INVENTOR(S) : Nobuo Fukushima

It is certified that error appears in the above-identified patent and that said Letters Patent is hereby corrected as shown below:

COLUMN 9:

Line 26, change "of" to --or--.

Line 37, change "value. The" to --value, the--.

COLUMN 10:

Line 7, change "$2\pi$," to --$2\pi$),--.

Line 56, change "portion" to --position--.

COLUMN 11:

Line 25, delete "and" (second occurrence).

COLUMN 12:

Line 22, delete "the".

Line 57, change "passes." to --passed.--.

UNITED STATES PATENT AND TRADEMARK OFFICE
CERTIFICATE OF CORRECTION

PATENT NO. : 4,816,937

DATED : March 28, 1989

INVENTOR(S) : Nobuo Fukushima

It is certified that error appears in the above-identified patent and that said Letters Patent is hereby corrected as shown below:

COLUMN 16:

Line 10, change "load condition said motor;" to --load condition of said motor--.

Signed and Sealed this

Twentieth Day of February, 1990

Attest:

JEFFREY M. SAMUELS

Attesting Officer     Acting Commissioner of Patents and Trademarks